(12) United States Patent
Im et al.

(10) Patent No.: US 12,104,992 B2
(45) Date of Patent: Oct. 1, 2024

(54) EXFOLIATIVE CELL PROCESSING DEVICE

(71) Applicant: BIODYNE CO., LTD., Gyeonggi-do (KR)

(72) Inventors: Wook Bin Im, Seongnam-Si (KR); Jae Joon Lee, Suwon-si (KR); Moo Seong Shin, Seoul (KR)

(73) Assignee: BIODYNE CO., LTD., Seoul (KR)

( * ) Notice: Subject to any disclaimer, the term of this patent is extended or adjusted under 35 U.S.C. 154(b) by 878 days.

(21) Appl. No.: 17/274,108

(22) PCT Filed: Jul. 31, 2019

(86) PCT No.: PCT/KR2019/009581
§ 371 (c)(1),
(2) Date: Mar. 5, 2021

(87) PCT Pub. No.: WO2020/050503
PCT Pub. Date: Mar. 12, 2020

(65) Prior Publication Data
US 2021/0333176 A1    Oct. 28, 2021

(30) Foreign Application Priority Data

Sep. 8, 2018   (KR) .................... 10-2018-0107442

(51) Int. Cl.
*G01N 1/28*      (2006.01)
*G01N 1/40*      (2006.01)
*G01N 35/00*     (2006.01)

(52) U.S. Cl.
CPC .......... *G01N 1/2813* (2013.01); *G01N 1/4077* (2013.01); *G01N 35/00029* (2013.01);
(Continued)

(58) Field of Classification Search
CPC ...... G01N 1/2813; G01N 1/28; G01N 1/2806; C12M 3/04
See application file for complete search history.

(56) References Cited

U.S. PATENT DOCUMENTS

| 5,240,606 A | 8/1993 | Lapidus et al. |
| 2004/0181344 A1 | 9/2004 | Stephanopoulos et al. |

(Continued)

FOREIGN PATENT DOCUMENTS

| EP | 1029228 A1 | 5/1999 |
| EP | 1261852 B1 | 11/2014 |

(Continued)

*Primary Examiner* — Elizabeth A Robinson
*Assistant Examiner* — Jonathan E Lepage
(74) *Attorney, Agent, or Firm* — PARK LAW FIRM

(57) ABSTRACT

The present invention relates to a technology related to an exfoliative cell processing device which obtains exfoliative cells out of a vial which has contained specimen of exfoliative cells (e.g., exfoliative cells and liquid medium) of a human body and then thinly smears the exfoliative cells on a cell smear slide. More specifically, the present invention relates to a technology for vertically entering the upper entrance of a vial which containing a specimen so as to extract a part of the specimen from the vial and then for thinly smearing the part of specimen on a cell smear slide which being disposed adjacent to the vial. The present invention has an advantage in that exfoliative cells may be attached in a thinly spread state on the lower surface of the specimen collector since the process of suctioning specimen from the vial.

5 Claims, 10 Drawing Sheets

(52) U.S. Cl.
CPC ............... *G01N 2001/4088* (2013.01); *G01N 2035/00138* (2013.01); *G01N 2035/00168* (2013.01)

(56) References Cited

U.S. PATENT DOCUMENTS

| | | |
|---|---|---|
| 2005/0169809 A1 | 8/2005 | Centeleghe et al. |
| 2012/0214227 A1 | 8/2012 | Kaufman et al. |
| 2016/0274135 A1 | 9/2016 | Park et al. |

FOREIGN PATENT DOCUMENTS

| | | | | |
|---|---|---|---|---|
| KR | 10-2015-0122524 A | 11/2015 | | |
| KR | 10-1641051 B1 | 7/2016 | | |
| KR | 10-2016-0099286 A | 8/2016 | | |
| KR | 10-2018-0052197 A | 5/2018 | | |
| WO | WO-03034076 A1 * | 4/2003 | ............ | B01D 61/18 |
| WO | 2016-167515 A1 | 10/2016 | | |
| WO | 2017130369 A1 | 8/2017 | | |

\* cited by examiner

EXFOLIATIVE CELL PROCESSING DEVICE

FIELD OF THE INVENTION

The present invention relates to an exfoliative cell processing device which obtains exfoliative cells out of a vial which has contained specimen of exfoliative cells (e.g., exfoliative cells and liquid medium) of a human body and then thinly smears the exfoliative cells on a cell smear slide.

More specifically, the present invention relates to a technology for vertically entering the upper entrance of a vial which containing a specimen so as to extract a part of the specimen from the vial and then for thinly smearing the part of specimen on a cell smear slide which being disposed adjacent to the vial.

BACKGROUND ART

In general, exfoliative cells are obtained from a specimen of a human body, and then are smeared (spread thinly) on a slide for papsmear test to observe and diagnose the state of the exfoliative cells.

In the papsmear test, the accurate observation and diagnosis of exfoliative cells may be achieved when the exfoliative cells are smeared on the slide in a single thin layer without overlapping.

However, the smearing on the slide for papsmear test are conventionally performed manually using tools (e.g., dropper, cotton swab).

As a result, due to the nature of exfoliative cells, if the exfoliative cells are exposed to user's skin, there is a risk of infection. Further, due to the manual smearing, the exfoliative cells overlap each other so as to form non-uniform layers, thereby interfering with observation and diagnosis.

Accordingly, a smearing technology is required so that specimen is sunctioned from a vial and then thinly smeared on a cell smear slide, without being manually handled using tools as in conventional art.

DISCLOSURE OF INVENTION

Technical Problem

The present invention is proposed in view of the above-mentioned feature. It is an object of the present invention to provide an exfoliative cell processing device which suctions a part of specimen from a vial and then thinly smears exfoliative cells of the suctioned specimen on a cell smear slide.

Technical Solution

In order to achieve the above object, the exfoliative cell processing device according to the present invention may comprise a base (110); a support wall (120) being arranged in an erected state on the upper surface of the base; a container support member (131) being mounted on the upper surface of the base and mounting on its upper surface a container member which contains specimen and has an opened upper part; a specimen collector (140) moving in and out of the container member in vertical direction along the longitudinal direction of the support wall so as to collect exfoliative cells and liquid medium of the container member, wherein the container member is in a state of being gripped by the container support member; a suction guide block (150) moving along the wall of the support wall with gripping the specimen collector and interfacing the specimen collector so as to suction the exfoliative cells and liquid medium out of the container member; a suction pump (160) of providing suction force to the specimen collector through the suction guide block, wherein the specimen collector is inserted inside the container member and suctions the exfoliative cells and liquid medium out of the container member by the suction force, and wherein the suction pump is operated by control of the pump control unit; and a cell smear slide (170) being disposed on a side of the container support member and moving left and right together with the container support member, wherein when a downward stroke is applied onto the specimen collector while the cell smear slide is disposed vertically under the specimen collector, the cell smear slide comes into contact with the lower surface of the specimen collector so as to let the exfoliative cells of the lower surface of the specimen collector be attached onto the upper surface of the cell smear slide.

Further, the specimen collector (140) may comprise: a collector body (141) being formed in a hollow cylindrical shape with an open upper portion; a cylindrical plate (142) being configured to mechanically block the lower part of the container member and being formed with a plurality of through-holes so as to allow access to the liquid medium and the exfoliative cells of the container member; and a cell collecting filter (143) being mounted on the lower surface of the cylindrical plate, wherein when suction force is applied on the inside of the collector body by the suction operation of the suction pump, the cell collecting filter passes the liquid medium of the container member into the collector body, but filters the exfoliative cells of the container member on its lower surface.

Further, the suction guide block (150) may comprise: a user operation block (151) being formed in a block shape so as to move along the wall of the support wall by user's grip operation; a support plate (152) being mounted on the lower surface of the user operation block; a suction holder member (153) sequentially passing through the support plate and the user operation block to be fitted in the vertical direction and transferring the suction force by the suction pump to the specimen collector as the open upper portion of the specimen collector is inserted into the lower portion of the suction holder member; an O-ring (154) being disposed to surround the outer wall of the suction holder member so that the inner wall of the specimen collector and the outer wall of the suction holder member are maintained in close contact with each other when the specimen collector is inserted into the suction holder member; a downward ejector (155) being disposed on the lower surface of the support plate with its central portion penetrating through the suction holder member, wherein the downward ejector separates the specimen collector out of the suction holder member when moving downward along the outer surface of the suction holder member, and then moves upward along the outer surface of the suction holder member by the elastic force; a plurality of moving rods (156) passing through the support plate so as to have their lower ends be connected to the downward ejector, wherein the moving rods stroke the downward ejector to downward direction when user operation of downward stroke is applied; a stroke handle (157) being arranged to connect the plurality of moving rods in the upper part of the support plate, and transferring a downward external force by a user operation to the plurality of moving rods so as to let the moving rods to be stroked in a downward direction; and a spring being fitted in each of the moving rods between the stroke handle and the support plate and forming tensile force extending along the longitudinal direction of the moving rod so that the upper surface of the downward ejector comes in contact with the lower surface of the support plate.

Further, the present invention may further comprise: a horizontal guide rail (210) being longitudinally disposed on the upper surface of the base corresponding to the front surface of the support wall; a horizontal guide block (220) being connected to the container support member on the upper surface thereof, wherein the horizontal guide block is connected to the slide support member on which the cell smear slide being seated, in the side of the container support member and slides left and right along the horizontal guide rail; and first and second stoppers (230, 240) being arranged in each end portion of the horizontal guide rail and controlling the leftward or rightward movements of the horizontal guide block.

Further, the present invention may further comprise: a vertical guide rail (310) being vertically disposed on the front surface of a support wall in which a suction guide block is positioned; a vertical guide block (320) being integrally connected to the suction guide block and sliding up and down along the vertical guide rail; third and fourth stoppers (330, 340) being arranged in each end portion of the vertical guide rail and controlling the upward or downward movement of the suction guide block; and a tension member being mounted on the vertical guide block and being configured to have an upward restoring force, thereby allowing the vertical guide block to be caught by the third stopper, wherein the third stopper is arranged in the top of the vertical guide rail.

Further, the present invention may further comprise: a liquid waste container member (410) being seated on the base and being connected to a suction holder member through a conduit, wherein when liquid medium is drawn from the container member into the suction holder member by operation of the suction pump, the liquid waste container member temporarily stores the liquid medium until the liquid medium is discarded in an external place by user operation.

Further, the present invention may further comprise: a cutting slot member (121) being formed by penetrating the support wall along the vertical direction of the support wall in parallel with the vertical guide rail; a pump operation switch (420) being disposed on the rear surface of the support wall adjacent to the cutting slot member, wherein the pump operation switch provides switching on-off signal to a pump control unit so as to turn on or off the operation of the suction pump by control of the pump control unit; and a suction arm (430) being connected to the rear surface of the suction guide block through the cutting slot member, wherein the suction arm moves up or down in association with the vertical movement of the suction guide block so as to move a pump operation lever of the pump operation switch, which rendering the pump operation switch to generate the switching on-off signal.

Advantageous Effects

The present invention has an advantage in that exfoliative cells may be attached in a thinly spread state on the lower surface of the specimen collector since the process of suctioning specimen from the vial.

Further, the present invention has an advantage in that a part of the exfoliative cells, which are suctioned so as to be attached in a thinly spread state on the lower surface of the specimen collector, may be attached in a thinly spread state on the upper surface of the cell smear slide only by vertically stroking the specimen collector.

Further, the present invention has an advantage in that an exfoliative cell processing device may be designed in small size since a container support member and a slide support member are mounted on a horizontal guide block so as to move left or right and to be positioned vertically under the specimen collector while moving move left or right. The conventional exfoliative cell processing device is formed in large size since the device has two separate configurations, i.e., a configuration for suctioning exfoliative cells from a container member and a configuration for smearing the suctioned exfoliative cells on a slide.

EMBODIMENT FOR CARRYING OUT THE INVENTION

Hereinafter, the present invention will be described in detail with reference to the drawings.

Figure 1:
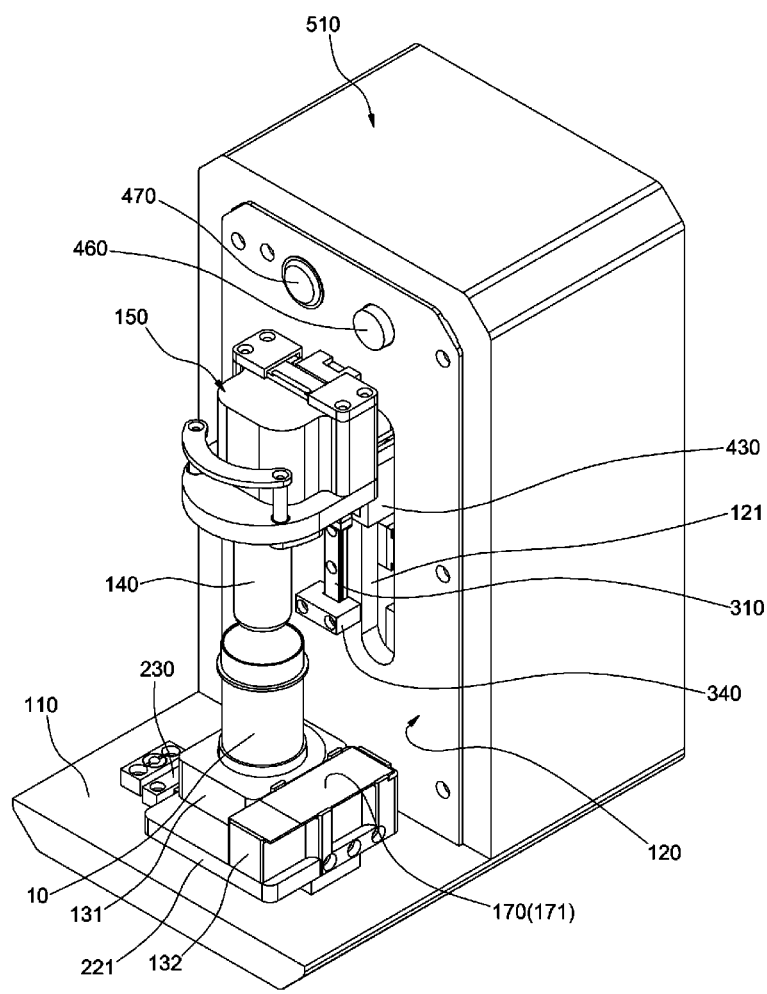
FIG. 1 is a first exemplary view showing the exfoliative cell processing device according to the present invention.
Figure 2:
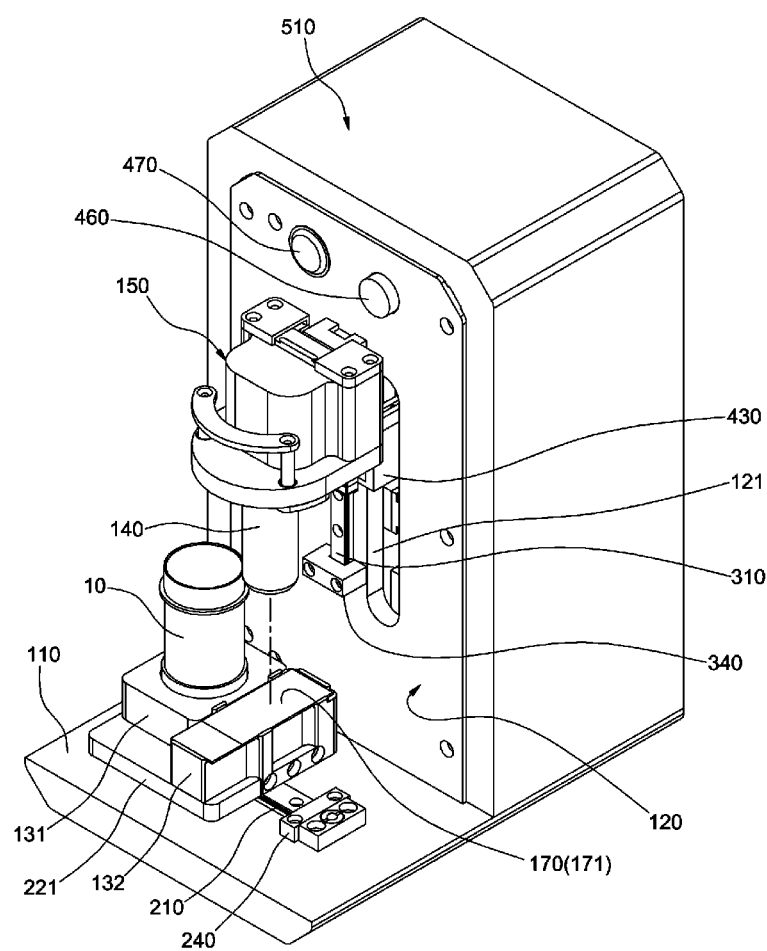
FIG. 2 is a second exemplary view showing the exfoliative cell processing device according to the present invention.
Figure 3:
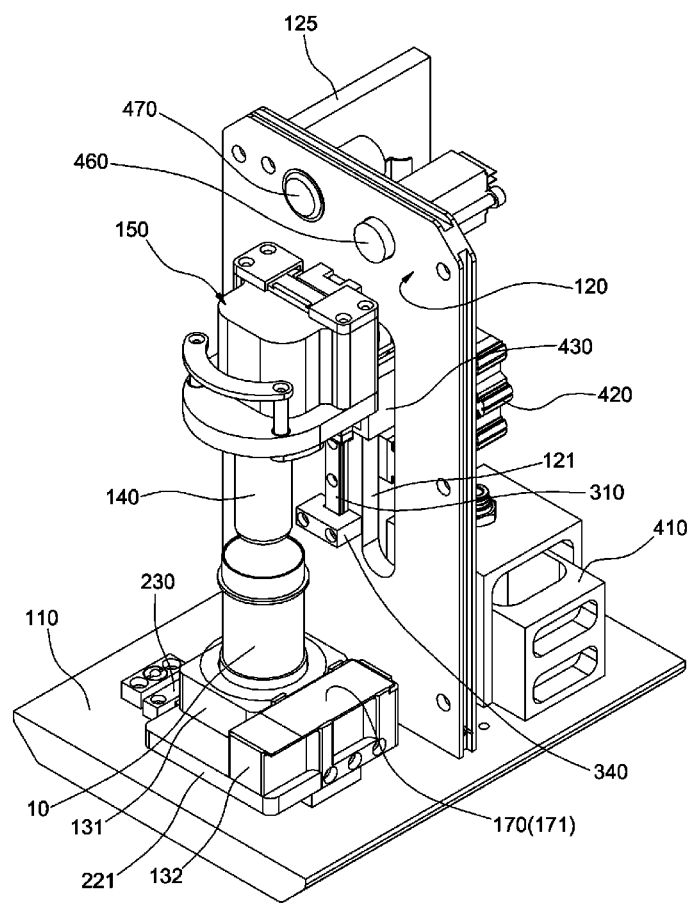
FIG. 3 is a view showing FIG. 1 in which an outer housing is removed.
Figure 4:
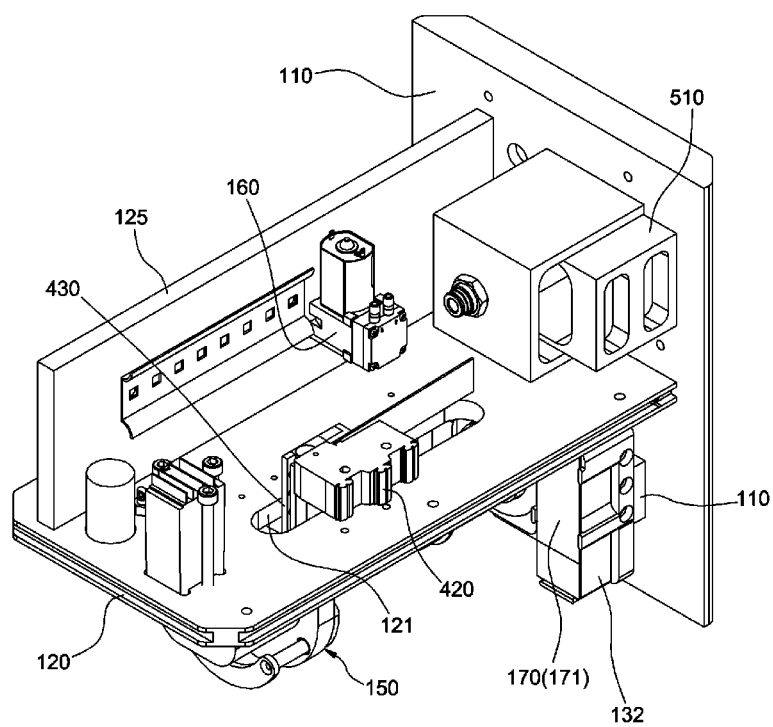
FIG. 4 is a view showing FIG. 3 from a different angle.
Figure 5:
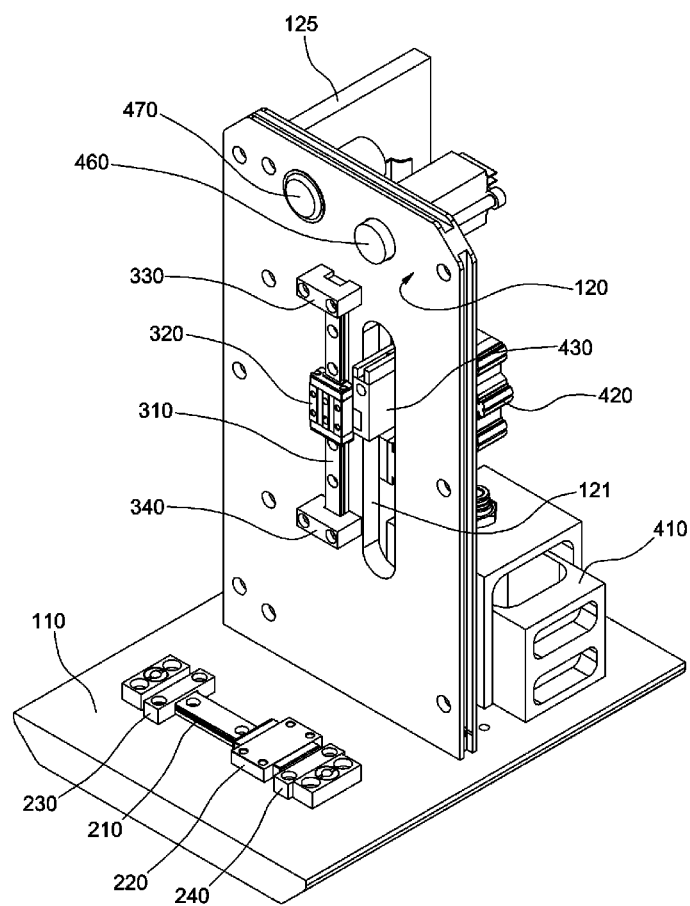
FIG. 5 is a view showing FIG. 4 in which a horizontal guide rail and a vertical guide rail are exposed.

FIG. 1 is a first exemplary view showing the exfoliative cell processing device according to the present invention, FIG. 2 is a second exemplary view showing the exfoliative cell processing device according to the present invention, FIG. 3 is a view showing FIG. 1 in which an outer housing is removed, FIG. 4 is a view showing FIG. 3 from a different angle, and FIG. 5 is a view showing FIG. 4 in which a horizontal guide rail and a vertical guide rail are exposed.

Referring to FIGS. 1 to 5, the exfoliative cell processing device according to the present invention comprises a base (110), a support wall (120), a container support member (131), a specimen collector (140), a suction guide block (150), a suction pump (160), and a cell smear slide (170).

As shown in FIGS. 1 to 5, the base (110) mounts components of the present invention on its upper surface, which including the support wall (120) and an auxiliary support wall (125).

Further, as shown in FIGS. 1 and 2, the outer housing (510) surrounding the edge of the support wall (120) may be mounted on the upper surface of the base (110) with covering each components being disposed on the rear surface of the support wall (120).

As shown in FIGS. 1 to 5, the support wall (120) of flat plate shape is arranged in an erected state on the upper surface of the base (110) so that the support wall (120) partitions its front section where a container member (10) is located and its rear section where a liquid waste container member (410) is located.

In addition, as shown in FIGS. 3 and 4, the auxiliary support wall (125) of plate shape may be mounted on the upper surface of the base (110). In the rear section of the support wall (120), the auxiliary support wall (125) is erected to be perpendicular to the support wall (120).

Further, as shown in FIGS. 1 to 3, the container member (10) may have an entrance on its upper end for containing a specimen (e.g., exfoliative cells and liquid medium) inside thereof.

In this specification, the "specimen" is composed of a liquid component of a human body and exfoliative cells which are obtained from a human body. The exfoliative cells are mixed in the liquid component. In addition, the liquid component is expressed as liquid medium for exfoliative cells in that the liquid component interfaces the exfoliative cells to be mixed each other or floating.

Further, the "specimen" may contain by-products other than the exfoliative cells or liquid medium, which are obtained from the human body.

As shown in FIGS. 1 to 3, the container support member (131) is formed in a block shape and is mounted on the upper surface of the base (110). The container support member (131) mounts on its upper surface the container member (10) which contains the specimen and whose upper part is opened.

Referring to FIG. 1, the specimen collector (140) moves in and out of the container member (10) in vertical direction along the longitudinal direction of the support wall (120) so as to collect the specimen of the container member (10). At this time, the container member (10) is in a state of being gripped by the container support member (131).

Referring to FIGS. 1 to 3, the suction guide block (150) is configured to move in vertical direction along the wall of the support wall (120) while gripping the specimen collector (140), and interfaces the specimen collector (140) so as to suction the specimen out of the container member (10).

The movement of the suction guide block (150) in the vertical direction along the support wall (120) on the front surface of the support wall (120) may be achieved by a user action of gripping and moving the suction guide block (150) in the vertical direction of the support wall (120).

Referring to FIG. 4, the suction pump (160) is mounted on the sidewall of the auxiliary support wall (125) and provides suction force to the specimen collector (140).

That is, while the specimen collector (140) being inserted inside the container member (10), when the suction pump (160) is operated by control of the pump control unit (not shown), the specimen collector (140) suctions in the specimen out of the container member (10) by the suction force of the suction pump (160) which communicating with the specimen collector (140) through the suction guide block (150).

As a result, a part of the specimen is suctioned toward the specimen collector (140), and then some exfoliative cells out of the specimen are adsorbed on the lower surface of the specimen collector (140).

As shown in FIGS. 1 and 2, the cell smear slide (170) is disposed on a side of the container support member (131) and moves left and right together with the container support member (131) by user operation.

Then, while the cell smear slide (170) being disposed vertically under the specimen collector (140) as shown in FIG. 2, when a downward stroke is applied onto the specimen collector (140), the upper surface of the cell smear slide (170) and the lower surface of the specimen collector (140) come into contact with each other so as to let the exfoliative cells of the lower surface of the specimen collector (140) be attached onto the upper surface of the cell smear slide (170).

In this case, the exfoliative cells are thinly smeared in a single layer on the upper surface of the cell smear slide (170). Therefore, an accurate inspection of the exfoliative cells through a microscope may be performed by simply placing the cell smear slide (170) on the slide holder of the microscope.

Further, referring to FIGS. 1 and 5, the exfoliative cell processing device according to the present invention may further comprises a horizontal guide rail (210), a horizontal guide block (220), a first stopper (230), a second stopper (240), a vertical guide rail (310), a vertical guide block (320), a third stopper (330), a fourth stopper (340), a liquid waste container member (410), a cutting slot member (121), a pump operation switch (420), and a suction arm (430).

As shown in FIG. 5, the horizontal guide rail (210) is longitudinally disposed on the upper surface of the base (110) corresponding to the front surface of the support wall (120), and the horizontal guide block (220) slides left and right along the horizontal guide rail (210).

The container support member (131) is connected to the upper surface of the horizontal guide block (220). The horizontal guide block (220) is connected to the slide support member (132), on which the cell smear slide (170) being seated, in the side of the container support member (131), and slides left and right along the horizontal guide rail (210).

A horizontal mount block (221) are mounted on the upper surface of the horizontal guide block (220), and the container support member (131) and the slide support member (132) are integrally connected to the horizontal mount block (221). The horizontal mount block (221) moves according to the movement of the horizontal guide block (220).

The first stopper (230) controls the leftward movement of the horizontal guide block (220) on the horizontal guide rail (210), and the second stopper (240) controls the rightward movement of the horizontal guide block (220) on the horizontal guide rail (210).

As shown in FIG. 5, the vertical guide rail (310) is vertically disposed on the front surface of a support wall (120) in which a suction guide block (150) is positioned, and the vertical guide block (320) slides up and down along a vertical guide rail (310).

The vertical guide block (320) is integrally connected to the suction guide block (150), and slides up and down along the vertical guide rail (310).

The third stopper (330) is disposed at the upper end portion of the vertical guide rail (310) so as to control the upward movement of the suction guide block (150). The fourth stopper (340) is disposed at the lower end portion of vertical guide rail (310) so as to control the downward movement of the suction guide block (150).

A tension member (not shown) is mounted on the vertical guide block (320) and is configured to have an upward restoring force, thereby allowing the vertical guide block (320) to be caught by the third stopper (330) when no external force (e.g., user operation) is applied to the suction guide block (150).

For example, when a user pulls the suction guide block (150) downward in order to move the specimen collector (140) downward, the suction guide block (150) moves downward along the vertical guide rail (310). Then, when the external force applied to the suction guide block (150) is released, the suction guide block (150) moves upward along the vertical guide rail (310) until the vertical guide block (320) is caught by the third stopper (330).

The liquid waste container member (410) is seated on the base (110) as shown in FIGS. 3 to 5 and is connected to a suction holder member (153) through a conduit (not shown). When liquid medium is drawn from the container member (10) into the suction holder member (153) by operation of the suction pump (160), the liquid waste container member (410) temporarily stores the liquid medium until the liquid medium is discarded in an external place by user operation.

As shown in FIGS. 1 to 5, the cutting slot member (121) is formed by penetrating the support wall (120) along the vertical direction of the support wall (120) in parallel with the vertical guide rail (310).

The pump operation switch (420) is disposed on the rear surface of the support wall (120) adjacent to the cutting slot member (121) as shown in FIGS. 3 to 5. The pump operation switch (420) provides switching on-off signal to a pump control unit (not shown) so as to turn on or off the operation of the suction pump (160) by control of the pump control unit (not shown).

As shown in FIGS. 3 to 5, the suction arm (430) is connected to the rear surface of the suction guide block (150) through the cutting slot member (121). The suction arm (430) moves up or down in association with the vertical movement of the suction guide block (150) so as to move a pump operation lever (not shown) of the pump operation switch (420).

As a result, in association with the movement of the pump operation lever (not shown), the pump operation switch (420) generates a switching on-off signal to be provided to a pump control unit (not shown) for letting the suction pump (160) turned on or off.

Meanwhile, reference numeral 460 denotes a suction time setting button, and reference numeral 470 denotes a power button.

The suction time setting button (460) corresponds to a suction time control unit (not shown). The suction time control unit (not shown) may be configured to cooperate with the pump control unit (not shown) so as to control one-time operation period (e.g., 3 seconds) of the suction pump (160).

Figure 6:
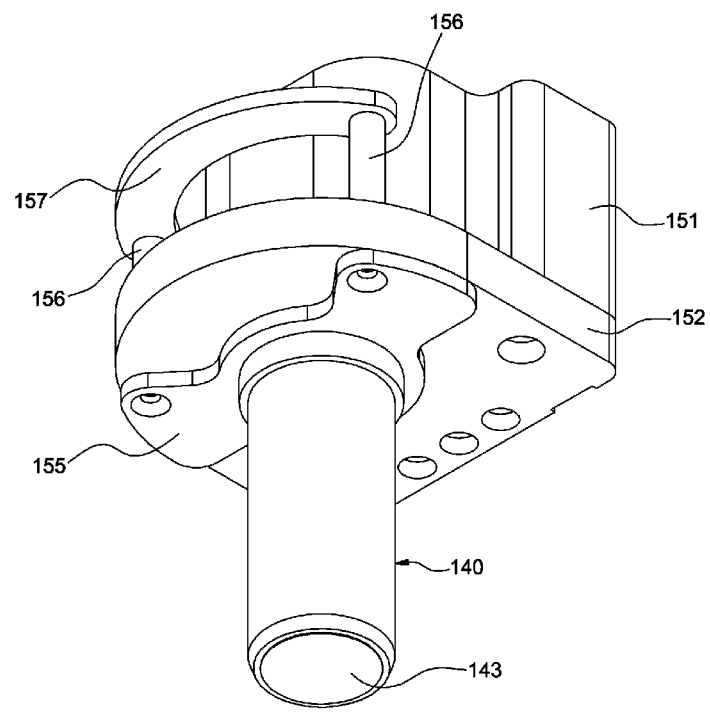
FIG. 6 is a view showing a suction guide block in which a specimen collector of the present invention is mounted.
Figure 7:
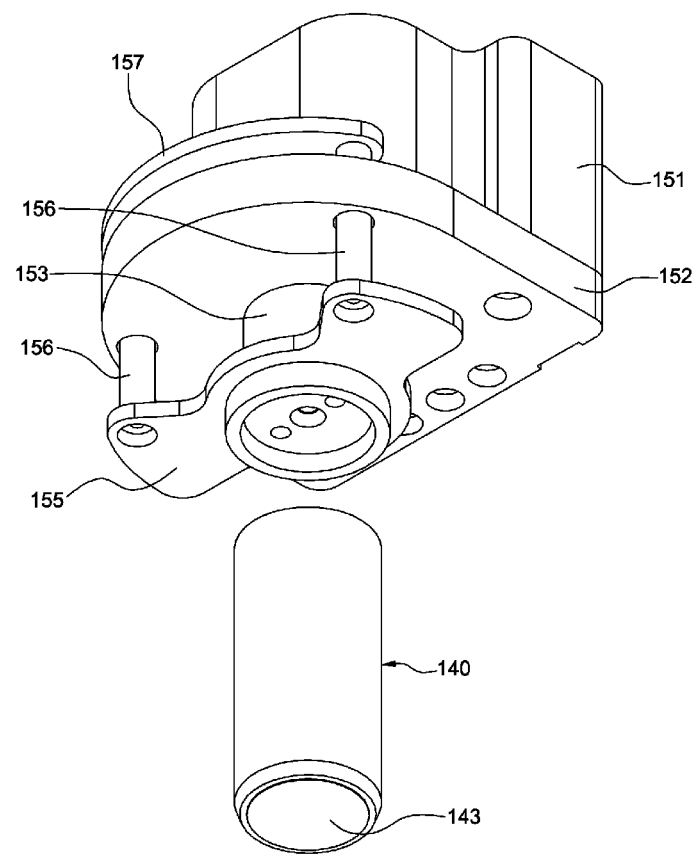
FIG. 7 is a view showing a suction guide block in which a specimen collector is unmounted from FIG. 6.
Figure 8:
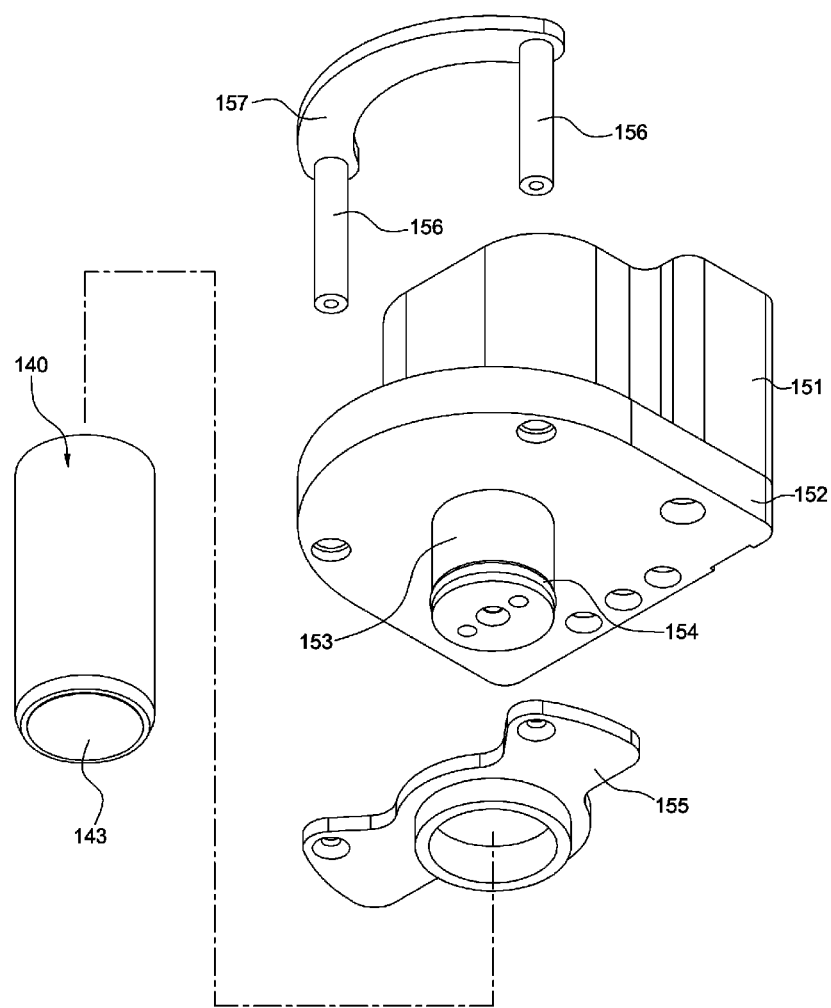
FIG. 8 is a view showing a suction guide block in which parts thereof are separated from FIG. 7.

FIG. 6 is a view showing a suction guide block in which a specimen collector of the present invention is mounted, FIG. 7 is a view showing a suction guide block in which a specimen collector is unmounted from FIG. 6, and FIG. 8 is a view showing a suction guide block in which parts thereof are separated from FIG. 7.

As shown in FIGS. 6 to 8, the suction guide block (150) may comprise a user operation block (151), a support plate (152), a suction holder member (153), an O-ring (154), a downward ejector (155), a moving rod (156), a stroke handle (157), and springs (not shown).

The user operation block (151) is formed in a block shape to enable a user's grip operation, and moves along the wall of the support wall (120) according to user's moving operation or restoring force of the tension member.

As shown in FIGS. 6 to 8, the support plate (152) is formed in a flat plate shape and is mounted on the lower surface of the user operation block (151).

The suction holder member (153) sequentially passes through the support plate (152) and the user operation block (151) to be fitted into the support plate (152) and the user operation block (151) in the vertical direction so as to communicate with the suction pump (160).

Further, the suction holder member (153) is configured to transfer the suction force by the suction pump (160) to the specimen collector (140) as the open upper portion of the specimen collector (140) is inserted into the lower portion of the suction holder member (153).

The suction holder member (153) may be connected through a conduit (not shown) to the suction pump (160) which is mounted on the auxiliary support wall (125).

As shown in FIG. 8, the O-ring (154) is disposed to surround the outer wall of the suction holder member (153), so that the inner wall of the specimen collector (140) and the outer wall of the suction holder member (153) are maintained in close contact with each other when the specimen collector (140) is inserted into the suction holder member (153).

As shown in FIGS. 6 to 8, the downward ejector (155) is disposed on the lower surface of the support plate (152) with its central portion penetrating through the suction holder member (153).

As shown in FIG. 7, the downward ejector (155) is configured to separate the specimen collector (140) out of the suction holder member (153) when the downward ejector (155) moves downward along the outer surface of the suction holder member (153). Then, as shown in FIG. 6, the downward ejector (155) is configured to move upward along the outer surface of the suction holder member (153) by the elastic restoring force of the spring in the moving rod (156).

As shown in FIGS. 6 to 8, the moving rods (156) pass through the support plate (152) so as to have their lower ends be connected to the downward ejector (155). The moving rods (156) stroke the downward ejector (155) to downward direction when user operation of downward stroke is applied.

The stroke handle (157) is arranged in the form of connecting a plurality of moving rods (156) in the upper part of the support plate (152), and transfers a downward external force by a user operation to the plurality of moving rods (156) so as to let the moving rods (156) to be stroked in a downward direction.

Each spring (not shown) is fitted in each of the moving rods (156) between the stroke handle (157) and the support plate (152).

As a result, the springs (not shown) form tensile force extending along the longitudinal direction of the moving rod (156) so that the upper surface of the downward ejector (155) comes in contact with the lower surface of the support plate (152).

The operation of the exfoliative cell processing device according to the present invention will be briefly described with reference to FIGS. 1 to 8.

First, the device is turned on by pressing the power button (470). The suction time setting button (460) is operated. Then, the suction time control unit (not shown) cooperates with the pump control unit (not shown) so as to set up one-time operation period (e.g., 3 seconds) which is the suction duration of the suction pump (160).

Then, the specimen collector (140) is mounted on the suction holder member (153), and the cell smear slide (170) and the container member (10) are loaded.

Then, the lower portion of the specimen collector (140) is immersed in the container member (10) by a user operation on the suction guide block (150).

As the specimen collector (140) moves downward, the suction is automatically started by the operation of the suction pump (160). The suction is continued during the operation period which is set up by the user operation on the suction time setting button (460).

While the suction is in progress, the exfoliative cells in the container member (10) is attached to the cell collecting filter (143) which is mounted on the lower part of the specimen collector (140), whereas the liquid medium is moved to the inside of the specimen collector (140).

Then, the horizontal mount block (221) is moved sideways by a user operation so that the cell smear slide (170) is positioned vertically below the specimen collector (140).

Then, when the suction guide block (150) is pulled downward by user operation, the specimen collector (140) moves downward. Then, the cell collecting filter (143) which is mounted on the lower part of the specimen collector (140) contacts the cell smear slide (170) so that some of the exfoliative cells on the lower surface of the cell collecting filter (143) are smeared, like in the way of stamping, on the upper surface of the cell smear slide (170).

Here, even when the specimen collector (140) is positioned vertically above the cell smear slide (170), the suction pump (160) operates in conjunction with the vertical movement of the suction guide block (150) so that the specimen collector (140) performs the suction operation.

In this way, when the specimen collector (140) which moving vertically on the cell smear slide (170) performs the suction operation, the liquid medium contained inside the specimen collector (140) may be prevented from falling downward.

Figure 9:
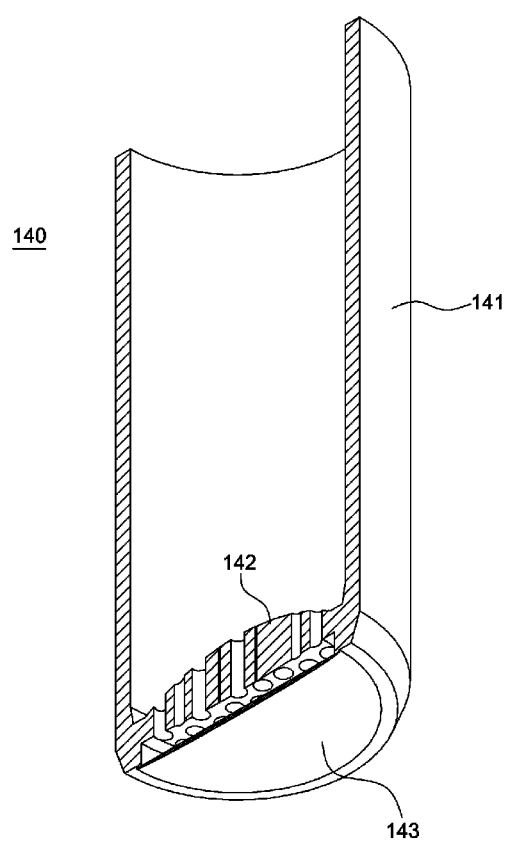
FIG. 9 is a cross-sectional view of a specimen collector of FIG. 8.
Figure 10:
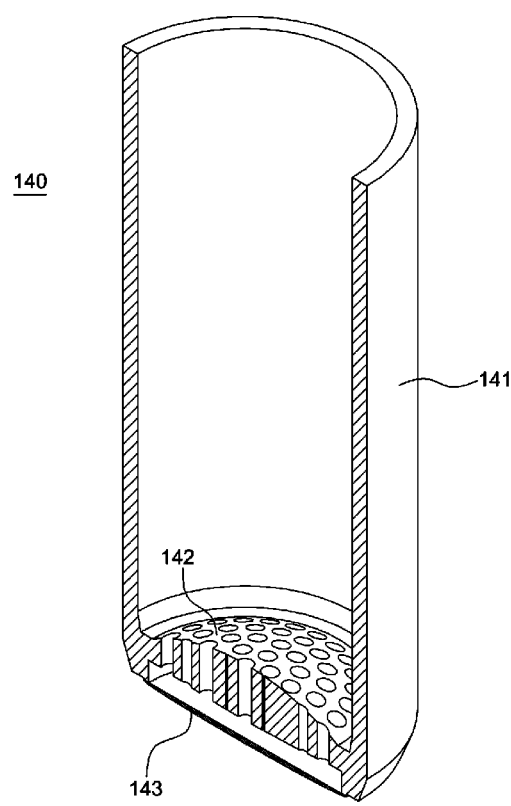
FIG. 10 is a view showing FIG. 9 from a different angle.

FIG. 9 is a cross-sectional view of a specimen collector of FIG. 8, and FIG. 10 is a view showing FIG. 9 from a different angle.

The specimen collector (140) may comprise a collector body (141), a cylindrical plate (142), and a cell collecting filter (143).

As shown in FIGS. 9 and 10, the collector body (141) may be formed in a hollow cylindrical shape with an open upper portion.

As shown in FIGS. 9 and 10, the cylindrical plate (142) may be configured to mechanically block the lower part of the container member (10). Further, the cylindrical plate (142) is formed with a plurality of through-holes so as to allow access to the liquid medium and the exfoliative cells of the container member (10).

The collector body (141) and the cylindrical plate (142) may be integrally molded as a plastic injection-molded product.

As shown in FIGS. 9 and 10, the cell collecting filter (143) is mounted on the lower surface of the cylindrical plate (142). Further, the cell collecting filter (143) may comprise a membrane filter, preferably a porous membrane.

As a result, when suction force is applied on the inside of the collector body (141) by the suction operation of the suction pump (160), the cell collecting filter (143) passes the liquid medium of the container member (10) into the collector body (141), but filters the exfoliative cells of the container member (10) on its lower surface.

At this time, the external force on the cell collecting filter (143) by the suction force of the suction pump (160) may be supported by the cylindrical plate (142).

More specifically, the cell collecting filter (143) may comprise a sub-membrane of sponge and a micro-membrane of film. The sub-membrane has a function of absorbing liquid medium. The micro-membrane is located on the lower surface of the sub-membrane so as to directly contact the exfoliative cells.

The invention claimed is:

1. An exfoliative cell processing device, comprising:
 a base (110);
 a support wall (120) being arranged in an erected state on the upper surface of the base;
 a container support member (131) mounted on the upper surface of the base;
 a container member which contains specimen and has an opened upper part mounted on the upper surface of the container support member (131);
 a specimen collector (140) moving in and out of the container member in a vertical direction along the longitudinal direction of the support wall so as to collect exfoliative cells and liquid medium of the container member, wherein the container member is in a state of being gripped by the container support member;
 a suction guide block (150) moving along the wall of the support wall gripping the specimen collector and interfacing the specimen collector so as to suction the exfoliative cells and liquid medium out of the container member;
 a suction pump (160) for providing suction force to the specimen collector through the suction guide block, wherein the specimen collector is inserted inside the container member and suctions the exfoliative cells and liquid medium out of the container member by the suction force, and wherein the suction pump is operated by control of the pump control unit; and
 a cell smear slide (170) being disposed on a side of the container support member and moving left and right together with the container support member, wherein when a downward stroke is applied onto the specimen collector while the cell smear slide is disposed vertically under the specimen collector, the cell smear slide comes into contact with the lower surface of the specimen collector so as to let the exfoliative cells of the lower surface of the specimen collector be attached onto the upper surface of the cell smear slide;
 wherein the suction guide block (150) comprises:
 a user operation block (151) being formed in a block shape so as to move along the wall of the support wall by a user's grip operation;
 a support plate (152) being mounted on the lower surface of the user operation block;
 a suction holder member (153) sequentially passing through the support plate and the user operation block to be fitted in the vertical direction and transferring the suction force by the suction pump to the specimen collector as the open upper portion of the specimen collector is inserted into the lower portion of the suction holder member; and
 an O-ring (154) being disposed to surround the outer wall of the suction holder member so that the inner wall of the specimen collector and the outer wall of the suction holder member are maintained in close contact with each other when the specimen collector is inserted into the suction holder member, and
 wherein the suction guide block (150) further comprises:
 a downward ejector (155) being disposed on the lower surface of the support plate with its central portion penetrating through the suction holder member, wherein the downward ejector separates the specimen collector out of the suction holder member when moving downward along the outer surface of the suction holder member, and then moves upward along the outer surface of the suction holder member by force created by the springs in the moving rod;
 a plurality of moving rods (156) passing through the support plate so as to have their lower ends be connected to the downward ejector, wherein the moving rods stroke the downward ejector to downward direction when user operation of downward stroke is applied;

a stroke handle (157) being arranged to connect the plurality of moving rods in the upper part of the support plate, and transferring a downward external force by a user operation to the plurality of moving rods so as to let the moving rods to be stroked in a downward direction; and a spring being fitted in each of the moving rods between the stroke handle and the support plate and forming tensile force extending along the longitudinal direction of the moving rod so that the upper surface of the downward ejector comes in contact with the lower surface of the support plate.

2. The exfoliative cell processing device according to claim 1, further comprising:

a horizontal guide rail (210) being longitudinally disposed on the base corresponding to the front surface of the support wall;

a horizontal guide block (220) being connected to the container support member on the upper surface thereof, wherein the horizontal guide block is connected to the slide support member on which the cell smear slide being seated, on the side of the container support member and slides left and right along the horizontal guide rail; and first and second stoppers (230, 240) being arranged on each end portion of the horizontal guide rail and controlling the leftward or rightward movements of the horizontal guide block.

3. The exfoliative cell processing device according to claim 2, further comprising:

a vertical guide rail (310) being vertically disposed on the front surface of the support wall in which a suction guide block is positioned;

a vertical guide block (320) being integrally connected to the suction guide block and sliding up and down along the vertical guide rail;

third and fourth stoppers (330, 340) being arranged on each end portion of the vertical guide rail and controlling the upward or downward movement of the suction guide block; and a tension member being mounted on the vertical guide block and being configured to have an upward restoring force, thereby allowing the vertical guide block to be caught by the third stopper, wherein the third stopper is arranged in the top of the vertical guide rail.

4. The exfoliative cell processing device according to claim 3, further comprising:

a liquid waste container member (410) being seated on the base and being connected to a suction holder member through a conduit, wherein when liquid medium is drawn from the container member into the suction holder member by operation of the suction pump, the liquid waste container member temporarily stores the liquid medium until the liquid medium is discarded in an external place by user operation.

5. The exfoliative cell processing device according to claim 4, further comprising:

a cutting slot member (121) being formed by penetrating the support wall along the vertical direction of the support wall in parallel with the vertical guide rail;

a pump operation switch (420) being disposed on the rear surface of the support wall adjacent to the cutting slot member, wherein the pump operation switch provides switching on-off signal to a pump control unit so as to turn on or off the operation of the suction pump by control of the pump control unit; and a suction arm (430) being connected to the rear surface of the suction guide block through the cutting slot member, wherein the suction arm moves up or down in association with the vertical movement of the suction guide block so as to move a pump operation lever of the pump operation switch, which rendering the pump operation switch to generate the switching on-off signal.

* * * * *